United States Patent Office 3,365,415
Patented Jan. 23, 1968

3,365,415
EPOXY RESINS EXTENDED WITH POLY-
NUCLEAR AROMATIC OILS
Walter E. Kramer, Niles, and Theodore H. Szawlowski,
Wonder Lake, Ill., assignors, by mesne assignments, to
Union Oil Company of California, Los Angeles, Calif.,
a corporation of California
No Drawing. Filed Dec. 4, 1961, Ser. No. 156,946
7 Claims. (Cl. 260—33.6)

This invention relates to oil-extended epoxy resins and their preparation. More particularly, this invention relates to cured epoxy resins, particularly polyepoxy resins, which have been treated with a solvent extract obtained from the solvent refining of mineral lubricating oils.

Epoxy resins have well-known and valuable properties, and are widely used as adhesives, encapsulating compounds, laminates, structural forms, and the like. Generally, the polyepoxy resin intermediates of the prior art are cured with polyamines, dibasic acids, polyamides, and the like. For this purpose, the curing agents are used in stoichiometric amounts based on the number of epoxide groups in the polyepoxy intermediate resin.

Because these epoxy resins are expensive, other less-expensive resins are frequently used in combination therewith as extenders. Such extenders include phenolformaldehyde resins, aniline-formaldehyde resins, polyester resins, polyvinyl chlorides, urea-formaldehyde resins, melamine-formaldehyde resins, and the like. These extenders, depending upon their properties and the conditions of the reaction, may or may not cross-link with the polyepoxy resin. Furthermore, these extenders usually cause significant differences in the properties of the finished resin. Epoxy resins have also been added to asphalts to obtain products of certain desired properties.

In accordance with the present invention, it has been found that epoxy resins can be extended with certain portions of solvent extracts obtained in the solvent refining of mineral lubricating oils. The extracts used in accordance with this invention, which are hereinafter more completely defined, are obtained as by-products from the solvent phase in the solvent refining of petroleum fractions for the purpose of removing deleterious, complex, polynuclear, aromatic materials therefrom, and to leave high-quality stable lubricating oils as the raffinate. Epoxy resins which have been extended with solvent extracts from lubricating oil manufacture, in accordance with this invention, are less costly than prior art extended epoxy resins, and have been found to possess properties generally similar to those of the unextended resins. In general, however, there is some increase in color, the extended resins of this invention are slightly softer, and there is some loss in toughness; otherwise, the properties of the extended resins are enhanced. However, the utility of the oil-extended epoxy resins prepared in accordance with this invention is not impaired, because although the resins are darker in color, they are flexible and thus are adaptable for use in structural forms, laminates, adhesives, encapsulating compounds, and the like.

Accordingly, it becomes a primary object of this invention to provide novel, oil-extended epoxy resins.

Another object of this invention is to provide a method of preparing oil-extended epoxy resins.

Another object of this invention is to provide epoxy resins which are extended by incorporation therein of solvent extracts from the manufacture of mineral lubricating oils.

Still a further object of this invention is to provide a method of preparing solvent-extract-extended epoxy resins.

The polyepoxy-resin intermediate used in preparing the extended resins of this invention can be any of the broad class of polyepoxides known to be useful in preparing cured resins. In general, these polyepoxides are straight-chain polymers prepared from low-molecular-weight diepoxides and contain an epoxide group at each end of the chain. The epoxy resins contemplated by this invention range from ethylene oxide polymerization products to the newest class of these materials as prepared from monomers having two or more reactive epoxide groups in the monomer structure.

The epoxy monomers are available commercially, both in liquid and solid forms (the term "monomer" as used herein includes compositions which the strictly monomeric or which are partially polymerized or contain small amounts of polymers), and are polymerized by addition of curing agents which include primary, secondary, and tertiary amines, and polyfunctional compounds such as glycols, polyglycols, polyamines, polyamides, and carboxylic acid anhydrides. The resins which are prepared by curing epoxy-resins monomers are cross-linked resins of the thermosetting type, and are characterized by high chemical and thermal stability at high tensile and impact strength. The resins are prepared by addition to the epoxy monomer of a small amount of a curing agent. The curing agent is added to the epoxy resin in an amount which is effective for the particular resin to promote the hardening of the resin. The selection of the particular curing agent is determined by the characteristics of the epoxy resin composition and the proportion of the curing agent may vary widely, although the use of about 5–20% wt. of the curing agent is preferred.

Preferably, the polyepoxide used as the starting material is aromatic in chemical character.

Thermosetting synthetic resins formed by the polymerization of an ethylene oxide derivative containing at least two ethylene-oxide groups in the molecule, in the presence of inorganic or organic bases (as described in U.S. Patent 2,444,333), can be used in accordance with this invention. These resinous condensation products are prepared by the reaction between epihalohydrin, for instance epichlorohydrin,

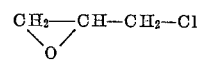

and bis-(4-hydroxyphenyl) dimethylmethane, commonly known as "Bis-phenol A," prepared by the condensation of 2 mols of phenol with 1 mol of acetone and having the formula,

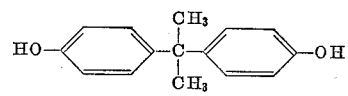

with or without an organic compound present corresponding to the general formula ZCNRNCZ, where R is a divalent organic radical free of functional groups other than the two NCZ groups and Z is a member selected from the class consisting of oxygen and sulfur.

The diphenol product is then reacted with epichlorohydrin in the presence of caustic to yield the diglycidyl ether in accordance with the equation:

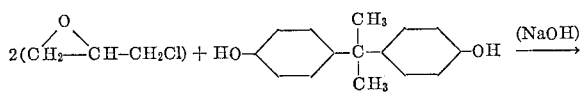 (NaOH) 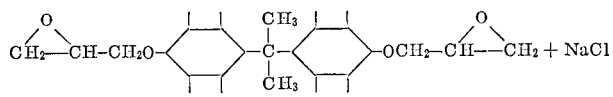

However, when the stoichiometric 2:1 ratio is employed, the yield of the monomeric diglycidyl ether is less than 10%, with the remaining material being higher-molecular-weight condensation and polymerization products. In order to obtain high yields of the monomeric product, excess epichlorohydrin is employed, the stoichiometric amount being doubled or tripled. It is then possible to obtain yields of 70% or more of the monomer. The epoxy "monomers" which are available commercially are generally mixtures containing varying amounts of the true monomer and other higher-molecular-weight condensation and polymerization products. The number of potentially useful reactants for the synthesis of epoxy resins is quite large. All varieties of polyhydric phenols, polyalcohols, polyfunctional halohydrins, and polyepoxides, have been suggested as intermediates in the literature. Many of these epoxy monomers which can be used in the preparation of epoxy resins are described in such text books as "Epoxy Resins," Skeist, Reinhold Publishing Corp., 1958, and "Epoxy Resins," Lee and Neville, McGraw-Hill Book Company, 1957. Compounds which are useful intermediates in the preparation of epoxy resins include diepoxides, such as butadiene diepoxide and divinylbenzene diepoxide, and diglycidyl ether,

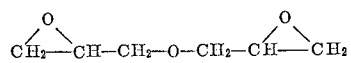

Other diglycidyl ethers include those produced by reaction of epichlorohydrin with other polyhydroxy compounds such as resorcinol, hydroquinone, pyrocatechol, saligenin, phloroglucinol, bisphenol F, trihydroxydiphenoldimethylmethane, fluor-4-dihydroxybisphenol, long-chain bisphenols, 4,4'-dihydroxydiphenol sulfone, novalac resins, ethylene glycol and higher glycols, glycerol, erythritol, penta-erythritol, etc., in the presence of alkali. Glycidyl esters are also known to be useful intermediates (resin monomers) in the preparation of epoxy resins. Such esters include the diglycidyl ester of diphenolic acid, diglycidyl esters of phthalic acids (all three isomers), and diglycidyl esters of aliphatic dibasic acids, e.g., succinic acid, suberic acid, pimelic acid, etc. In the copending application of Walter E. Kramer and Louis A. Joo, Serial No. 58,638, filed September 27, 1960, the diepoxy esters of 4,4'-tetrahydrodipyridyl dicarbamic acid (and analogs thereof), are disclosed as being novel epoxy resin monomers.

The resinous condensation products thus formed, which are prepared by one method in accordance with U.S. Patent 2,444,333 infra, are known as "Epon" resins which range from solids to viscous liquids having molecular weights in the order of about 1000 to 3000. In one form, this condensation reaction is carried out by employing a ratio of epihalohydrin to the bis-phenol at slightly below or around 2:1. Also, resinous products prepared in accordance with U.S. Patent 2,594,979 can be used.

In accordance with this invention, the polyepoxy resin intermediate is heated with a nonviscous epoxide and the solvent extract at a temperature of about 260° F. to 390° F. in the presence of a tertiary amine. The nonviscous epoxide serves primarily as a viscosity-reducing agent and also generates a partially polymerized product which acts as a solubilizing agent to increase the extent to which the constituents of the solvent extract are taken up by the epoxy phase. Thus, the relative amounts of the polyepoxy intermediate and the epoxide diluent are not critical, but are dependent upon the characteristics of the solvent extract used and upon the degree to which the cured resin is to be extended. For purposes of this invention, suitable nonviscous epoxide diluents include epichlorohydrin, phenyl glycidyl ether, dicyclopentadiene dioxide, vinyl cyclohexene dioxide, resorcinol diglycidyl ether, diglycidyl ether, 2,6-diglycidylphenyl glycidyl ether, etc.

In carrying out the reaction, it is found that most of the solvent-extract constituents taken up by the epoxide phase appear to be from the polynuclear, aromatic content of the solvent extract. The depth of which these compounds are removed or dissolved from the solvent extract by the epoxide mixture depends on the nature of the polyepoxide resin intermediate, the nature of the epoxide diluent, the temperature of contact, and the composition of the solvent extract. In general, the best results are obtained when the solvent extract and epoxides are contacted at the maximum temperature which can be achieved conveniently without thermal degradation of the solvent extract and/or epoxides. Thus when the reaction of this invention is carried out at atmospheric pressure, the pot temperature is determined by the reflux temperature of the lowest-boiling constituent (epichlorohydrin). After 1-hour heating under total reflux, the lowest-boiling constituents are allowed to distill off until the pot temperature reaches about 350° F. to 390° F. This temperature is held for 20–30 minutes by maintaining total reflux; then the reaction mixture is cooled.

Relative amounts of solvent extract, polyepoxide resin intermediate, and epoxide diluent are selected so that the concentration of the solvent-extract constituents carried into the final epoxide-extract solution is not greater than about 30%. The lowest concentration of the solvent extract in the end product which still retains the benefits of this invention is about 10%. Higher or lower concentrations than these values are likely to result in insufficient curing reaction, or difficulties in the completion of the curing reactions.

As one feature of the invention, a tertiary amine is included in a catalytic amount (0.2% to 1.0% of total charge) in the extract-epoxide mixture during the heating operation. The presence of the amine causes partial polymerization of the polyepoxide resin intermediate and epoxide diluent. This partially polymerized product enhances the solubilizing effect of the epoxides on the solvent extract. Suitable tertiary amines which act as catalysts for the reaction include pyridine, α-, β-, or γ-picoline, quinoline, isoquinoline, quinaldine, and other heterocyclic bases.

After the epoxides (with or without the tertiary amine catalyst) have been contacted with the solvent extracts for a period of about 10 minutes to 2 hours, the agitation and heating is stopped and the mixture is allowed to cool. Upon completion of the cooling operation, an oil phase separates consisting of solvent-extract-oil constituents which have not been taken up by the epoxide phase. This oil phase is withdrawn from the reaction vessel and discarded. The resulting epoxide phase is then mixed with any of the known agents for curing epoxy resins, and the mixture is poured into a suitable mold and allowed to cure at room temperature, or warmed slightly, to initiate an exothermic reaction. Once the main curing reaction has subsided, it is usually necessary to finish the curing process by heating the casting for 2–3 hours at 120° C. Suitable curing agents for this phase of the process include a wide range of polyfunctional compounds such as polyamines, dibasic acids, and polyamides. The curing reaction is carried out in a known manner, using stoichiometric amounts of curing agent based on the number of epoxy groups in the mixture. The initial curing reaction is generally maintained at a temperature below about 200° F. to avoid degradation of the reactants and the cured resin. An initial curing temperature of about 70° to 150° F. is generally preferred.

In order to illustrate the invention, the following examples are given:

EXAMPLE I

Thirty grams of extract oil from the production of 200 vis. neutral, 20 g. of epichlorohydrin, 10 g. of Epon 812 (a proprietary product of Shell Chemical Co., consisting of a condensation product of an aliphatic alcohol and epichlorohydrin, and having a viscosity of 0.9–1.5 poises at 25° C., and an epoxide equivalent of 140–160), and 0.35 g. of pyridine (as catalyst to promote partial polymerization of epoxies) were combined and heated for 1 hour under total reflux. Then the low-boiling components were allowed to distill off until the pot temperature reached about 350°–390° F. The reaction mixture was cooled to room temperature, and 5 g. of epichlorohydrin and 20 g. of Epon 820 (Shell Chemical Co. epoxy resin, prepared by the condensation of Bisphenol-A and epichlorohydrin, and having a viscosity of 40–100 poises at 25° C. and an epoxide equivalent of 180–195) were added, and the mixture was heated at 210–220° F. for 5–10 minutes, and stirred again to take up more constituents from the extract oil, and to attain a higher concentration of polyepoxide intermediate in the mixture.

At the end of the second heating period, stirring was stopped and the mixture was cooled, whereupon an oil phase separated as an upper layer. This oil phase was withdrawn, and 10 g. of triethylene tetramine were mixed with the epoxide solution as a curing agent. The mixture was cured at room temperature until the casting was firm, then cured an additional 2–3 hours in an oven kept at 120° C. until the curing reaction had gone to completion. The cured resin was dark in color, slightly flexible, and tough.

EXAMPLE II

The reaction of Example I is repeated, using 0.35 gram of quinoline, and a cured epoxy resin is recovered which is brown in color, slightly flexible, and suitable as a protective coating.

EXAMPLE III

Fifty g. of solvent extract No. 44, 20 g. of Epon 812, and 035 g. of pyridine are reacted at about 400° F. for 1 hour. Two phases are formed, a lower dense phase and an upper hydrocarbon phase. The phases are separated and the lower dense phase is blended with 30 g. of Epon 820 and heated with stirring at 220° F. for 5 minutes. It is then cured by reaction with 15 g. of phthalic anhydride to produce a modified resin having excellent hardness, toughness, and impact resistance. About 36% of the solvent extract is incorporated into the resin.

EXAMPLE IV

Fifty g. of solvent extract No. 43, 20 g. of Epon 812, and 0.35 g. of pyridine are reacted at about 400° F. for 1 hour. Two phases are formed, a lower dense phase and an upper hydrocarbon phase. The phases are separated and the lower dense phase is blended with 30 g. of Epon 820 and heated at 220° F. for 5 minutes. This mixture is then cured by reaction with 15 g. of phthalic anhydride to produce a modified resin having excellent hardness, toughness and impact resistance. About 23% of the solvent extract is incorporated in the resin.

EXAMPLE V

Fifty g. of solvent extract No. 41, 20 g. of Epon 812, and 15 drops of pyridine are reacted at about 400° F. for 1 hour. Two phases are formed, a lower dense phase and an upper hydrocarbon phase. The phases are separated and the lower dense phase is blended with 30 g. of Epon 820 and heated at 220° F. for 5 minutes. This mixture is then cured by reaction with 15 g. of phthalic anhydride to produce a modified resin having excellent hardness, toughness and impact resistance. About 14% of the solvent extract is incorporated in the resin.

EXAMPLE VI

Three g. of solvent extract No. 44 (Table I), 3.0 g. of Epon 812 (an aliphatic-type epoxy resin made by reacting glycerol and epichlorohydrin), 2.0 g. of epichlorohydrin and 5 drops of pyridine were mixed and heated with continuous stirring for 5 minutes at a temperature of about 260°–300° F., and then for 10 minutes at about 360° F. An evaporation loss of about 2.0 g. was noted and the product changed from brown to black. The mixture was cooled to room temperature and 0.6 g. of triethylene tetramine (a typical polyamine curing agent for epoxy resins) was added. The reaction mixture became warm and was placed at once in an oven maintained at 110° C. The oven-cure was maintained for 2 hours.

The product was removed from the oven and it was observed that the product had separated into two phases, a top layer of a soft, oily, gel consistency and a bottom layer which formed a porous hard casting. The cure was a failure since the product was not a uniform solid and the oil separation was poor. If during the reaction the epichlorohydrin is boiled off, the light oil (non-aromatic) will not separate out as a distinct layer, but instead, forms a fine, milky emulsion when the reaction mixture is cooled. The warming during the mixing period with triethylene tetramine probably initiated the emulsion breakdown and the subsequent oven cure, and during exotherm, completed the separation of light oil into the separate top layer.

EXAMPLE VII

Three g. of solvent extract No. 44, 3.0 g. of Epon 812 and 2.0 g. of epichlorohydrin were mixed and heated for 5 minutes at a temperature of 260° to 340° F. No color change was observed. After continued heating for 15 minutes at 360° to 380° F., an evaporation loss of 2.23 g. (mainly epichlorohydrin) was recorded.

The reaction product was cured by cooling to room temperature, adding 0.9 g. triethylene tetramine to the cold mixture and placing the mixture in an oven maintained at 110° C. for 2 hours. This resulted in the formation of a solid, well-cured casting with no oil separation.

In this experiment, a successful cure was obtained of a cold emulsion mixture by the application of heat. The amount of triethylene tetramine was about twice the stoichiometric requirements. There was no light-oil separation because all of the epichlorohydrin was boiled off. The high viscosity of the blend kept the oil in stable emulsion. The example shows that pyridine is not necessary for this type of treatment.

EXAMPLE VIII

Three g. of solvent extract No. 44 and 3.0 g. of Epon 812 were mixed and heated with stirring for 15 minutes at 390° F. The mixture was cooled to room temperature and cured, while cool, by the addition of 0.6 g. of triethylene tetramine (TETA) with mixing. The mixture was placed in an oven and maintained at 110° C. for 2 hours. The product was a solid well-cured unit with no oil separation.

This example illustrates that neither epichlorohydrin nor catalyst are necessary and that a successful cold emulsion-cure can be obtained by heating the product mixture. It also demonstrates that the solvent extract will dissolve in Epon 812 without the aid of epichlorohydrin.

EXAMPLE IX

Three g. of solvent extract No. 44, 2.3 g. of Epon 812, 2.0 g. of epichlorohydrin and 5 drops of pyridine were heated with stirring at 260°–390° F. for about 10 minutes. The mixture changed from brown to black and most of the epichlorohydrin was boiled off as evidenced by an evaporation loss of 1.9 g. The mixture was cooled down to a temperature of 150° F. and 2.3 g. of Epon 820, an aromatic-based epoxy resin produced by reaction of a Bisphenol-A and epichlorohydrin, and 0.5 g. of epichlorohydrin were added. The mixture was heated with agitation for about 5 minutes at a temperature of 240° F. Curing was accomplished by cooling the resulting product to room temperature, adding 0.8 g. of TETA, warming the mixture to about 80° F., and placement in an oven maintained at 110° C. for 2 hours. This resulted in a solid black casting with traces of waxy oil along the edges.

In this experiment, the oil separation was reduced somewhat. The example showed that the presence of a small amount of epichlorohydrin tends to disturb the oil-in-epoxy emulsion. Heating in the presence of pyridine produced a black product of undesirable physical properties.

EXAMPLE X

Three g. of solvent extract No. 44, 2.3 g. of Epon 812 and 2.0 g. of epichlorohydrin were mixed and heated at 390° F. for 10 minutes. No color change took place and 2.1 g. of evaporation loss, mostly epichlorohydrin, was noted. The reaction mixture was cooled to room temperature, 2.0 g. of Epon 820 added, and the mixture was heated to 240° F. for 4 minutes with stirring.

The resulting product was cured by cooling again to room temperature, adding 0.8 g. of TETA, with slight warming, and placement in an oven maintained at 110° C. (230° F.) for 2 hours to produce a solid, brown casting which exhibited only very slight oil separation in the form of an oily film on the surface. This indicates, first, that pyridine is not necessary in a two-step process, second, that if all of the epichlorohydrin is boiled off, oil separation is minimized in a two-step process and, third, that the combination of Epon 812 and Epon 820 takes up all of the solvent extract.

EXAMPLE XI

Three g. of solvent extract No. 44 and 3.0 g. of Epon 820 were heated with stirring at 390° F. for 15 minutes. The product mixture became a darker brown color, but the overall color change was slight in comparison with the other tests. The reaction product was cooled to room temperature and 0.6 g. of TETA added, while the mixture was being stirred and warmed slightly, to effect a cure. The mixture was then placed in an oven and maintained at 110° C. for 2 hours.

The product, on examination, was found to have separated into two phases, a soft oily gel in the upper layer constituting about 20% of the product, and the remainder (80%) being a solid, cured, bottom layer. From this experiment, it was concluded that Epon 820 (aromatic-based epoxy) does not have the proper tolerance for the non-aromatic portion of the solvent extract. This also indicates that in order to obtain about 100% incorporation of solvent extract, both Epon 812 (aliphatic-based epoxy) and Epon 820 (aromatic-based epoxy) should be used together. Also, if epichlorohydrin is added before the cure, the emulsion breaks, causing the non-aromatic portions of the solvent extract to separate as an upper layer.

EXAMPLE XII

Three g. of solvent extract No. 44, 3.0 g. of Epon 820, and 2.0 g. of epichlorohydrin were mixed together and heated to 390° F. for 15 minutes. The mixture became slightly darker in color and all of the epichlorohydrin boiled off as evidenced by a 2.0 g. evaporation loss. The mixture was cured by cooling to room temperature, at which time the product took on the milky appearance of an emulsion, adding 0.6 g. of TETA, and heating in an oven at 110° C. for 2 hours. On examination, the product was found to have separated into two phases, 20% of which was an oily, gel-like top phase and 80% of which was a hard, solid, cured casting constituting the bottom phase. The emulsion observed was stable at room temperature. The stability of the oil-in-epoxy emulsion remained intact if all the uncombined epichlorohydrin was boiled off before the cooling and curing operations were started. In this case, oil separation occurred only after the heat-of-curing operation disturbed the emulsion's stability.

EXAMPLE XIII

Exactly 3.66 g. of solvent extract No. 44, 3.66 g. of Epon 820, and 2.0 g. of epichlorohydrin were heated and stirred for 10 minutes at 390° to 420° F. As all of the epichlorohydrin boiled off, a total evaporation loss of 2.15 g. was recorded. The mixture was cured by cooling to room temperature, during which the mixture became milky in appearance and exhibited the properties of an emulsion, 0.7 g. of TETA were added, with slow mixing and warming, followed by cooling to room temperature to stabilize the emulsion. After 40 minutes standing at room temperature, the mixture was stirred vigorously again and allowed to stand. The mixture hardened in 4 to 5 hours at room temperature to an excellent, hard, completely uniform casting.

The example illustrates one feature of this invention, wherein the combination of solvent extract and an aromatic-based epoxy resin gave a stable emulsion which readily cured with an amine curing agent to a hard, uniform product. Also, this example illustrates that the milky emulsion formed during the initial cooling will remain stable if cured at a low temperature, e.g., 40° to 95° F., and that pyridine or epichlorohydrin are not necessary to effect 100% oil emulsification and inclusion in the cured resin.

EXAMPLE XIV

In this experiment, 3.0 g. of solvent extract No. 44, 3.0 g. of Epon 812, 2.0 g. of epichlorohydrin, and 5 drops of pyridine were mixed and heated moderately to a temperature of only 290° F. for 5 minutes. Evaporation losses were only 0.65 g., indicating that most of the epichlorohydrin was retained. The reaction mixture turned black and on cooling tended to separate into two phases, a light oil phase on top and a black viscous bottom phase. Without removal of the top oil layer, 0.95 g. of TETA was added, and the mixture was stirred slowly and warmed to keep the oil layer separated on top. The cure was completed in an oven at 110° C., producing two phases, a top layer of light-colored oil and a bottom phase of solid, cured, black resin.

The retention of the epichlorohydrin in the mixture caused a definite and rapid phase separation of non-aromatic oil from the heavy aromatic portions of the solvent extract. The presence of pyridine caused some polymerization of epichlorohydrin to form a black polymer which stayed in the heavy bottom portion containing the epoxy resin and aromatics. The black coloration was useful in showing the sharp line of demarcation between the phases.

EXAMPLE XV

Another experiment was conducted, in which both pyridine and epichlorohydrin were omitted, by heating together 3.0 g. of solvent extract No. 44, 1.5 g. of Epon 812, and 1.5 g. of Epon 820 for 10 minutes at 390° to 420° F. There was no color change or evaporation loss. The reaction mixture was uniform, and on cooling to room temperature, an emulsion was seen to form. Then 0.6 g. of TETA was added and the mixture mixed thoroughly while being warmed to 85° F. After mixing, the mixture was cooled to 70° F. and left to cure at room temperature. This resulted in an excellent hard cure and a uniform casting.

The combination of the aliphatic- and aromatic-based epoxy resins favored complete incorporation of the solvent extract in the cured resin and no discoloration resulted. Low-temperature curing, under which conditions the cold oil/epoxy emulsion remained stable, resulted in an excellent product and neither pyridine nor epichlorohydrin were necessary.

EXAMPLE XVI

In this experiment, an attempt was made to incorporate both types of epoxy resin using epichlorohydrin and pyridine with a double low-temperature heating treatment. Three g. of solvent extract No. 44, 1.0 g. of Epon 812, 2.0 g. of epichlorohydrin, and 5 drops of pyridine were mixed and heated for 5 minutes at 260° to 280° F. The mixture turned black in color and showed an evaporation loss of 0.42 g. After cooling, the mixture was treated with 2.0 g. of Epon 820 and 0.5 g. of epichlorohydrin, thoroughly mixed, and heated to about 240° F. for 5 minutes with continued stirring. The mixture was cooled and allowed to separate into two phases, the light-colored oil on top was separated, and the black-colored bottom layer was mixed with 0.8 g. of TETA at 85° to 90° F. and allowed to cure at room temperature. This treatment resulted in a cured resin that was hard and black. On examination, the cured product was found to be too brittle and lacked toughness. This was due to the inclusion of epichlorohydrin in the cured product.

From this experiment, it was concluded that the epichlorohydrin should be distilled off, after the removal of the light-oil top layer, in order to obtain a cured resin that is tough but not brittle. Also, a large amount of epichlorohydrin is necessary for clear-cut separation into two phases.

EXAMPLE XVII

A similar experiment without pyridine was conducted as in Example XVI.

Three g. of solvent extract No. 44 and 1.0 g. of Epon 812 were mixed with 2.0 g. of epichlorohydrin and heated to 390° to 425° F. for 15 minutes. All volatiles were boiled off, giving an evaporation loss of 2.0 g., and no color change resulted. The mixture was cooled to room temperature, and 2.0 g. of Epon 820 and 0.5 g. of epichlorohydrin were added. The mixture was next heated to 240° to 260° F. for 3 to 4 minutes and cured by cooling to 70° F., while mixing thoroughly to maintain a uniform, stable emulsion. Then 0.6 g. of TETA were added while the mixtures were at 70° F., and the resulting mixture was allowed to stand at room temperature. After standing overnight, the product was found to be an excellent, hard, non-brittle casting with only a trace of an oily film on the surface.

The cold-emulsion curing technique was successful even when a small amount of epichlorohydrin was present in the mixture. The temperature should be kept low enough to maintain a stable emulsion during the curing period. For 100% inclusion of the solvent extract in the product, the ratio of Epon 812 to Epon 820 should be about 1:1. In this example, the traces of oil on the surface of the product were due to an Epon 812/Epon 820 ratio of 1:2.

The extract oils used in accordance with this invention are well known by-products of the solvent extraction of mineral lubricating oils and are adequately described as those aromatic materials separated from mineral lubricating oils and their fractions, i.e., those aromatics obtained in the manufacture and refining of neutral oils and bright stocks, during treatment with a selective solvent designed to extract the predominantly aromatic materials from the paraffinic materials. Extract oils resulting from the treatment of mineral lubricating oils for the purpose of separating non-aromatic hydrocarbons (the raffinate and finished oil) from the aromatic hydrocarbons (the extract oil and waste product) are used as the starting materials in this invention.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS (Saybolt Universal Seconds; ASTM D88–56) at 210° F. of 1249, flash 585° F., fire 650° F., C.R. of 13.9 weight percent, and may be black in color. The desaphalted oil may have an API gravity of 21.5° to 21.8°, viscosity SUS 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an east Texas field with an API gravity of 33.1 was topped to remove such light fractions as gasoline, naphtha, kerosine, and a light lubricating distillate. The vacuum residue was a reduced crude having a viscosity of 1251 SUS at 210° F., 2.2 percent sulfur, and an API gravity of 12.6. After propane-deasphalting, the oil had a viscosity of 174 SUS at 210° F. and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, Chlorex, chlorophenol, trichloroethylene, cresylic acid, pyridine, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

TABLE I.—SOURCES AND PHYSICAL CHARACTERISTICS OF SOLVENT EXTRACTS

| Ext. No. | Crude Source | Solvent | API Grav. | Vis./100° F., Secs. | Vis./130° F., Secs. | Vis./210° F., Secs. | V.I. | °F. Pour | °F. Flash | °F. Fire | Percent C.R. | Percent Sulfur |
|---|---|---|---|---|---|---|---|---|---|---|---|---|
| 1 | East Tex | Phenol | 11.1 | 23,319 | 4,750 | 282 | −40 | +55 | | | 7.2 | 2.60 |
| 2 | do | do | 15.4 | 15,000 | | 285 | +39 | | | | | |
| 3 | do | do | 12.6 | 36,410 | 4,310 | 310.1 | −1 | +80 | | | 4.7 | 2.27 |
| 4 | do | do | 14.6 | 19,500 | 4,305 | 313 | +27 | +90 | | | 4.7 | 2.2 |
| 5 | do | do | 15.4 | 32,500 | | 372 | +5 | +60 | | | 4.13 | 2.33 |
| 6 | do | do | 13.7 | 25,000 | 5,400 | 355 | +27 | +80 | | | | 2.18 |
| 7 | do | do | 8.6 | 145,000 | 19,000 | 616 | 0 | +70 | | | | |
| 8 | do | do | 10.5 | 12,676 | 2,514 | 172.1 | −101 | +60 | | | | 2.18 |
| 9 | Santa Fe Springs | do | 10.2 | | | 371 | | +65 | 520 | 600 | | |
| 10 | Texas | Furfural | 13.0 | | | 1,500 | | +85 | 470 | 515 | | |
| 11 | Penn | Chlorex | 12.2 | | | 1,365 | | +85 | 560 | 630 | | |
| 12 | Penn | Nitrobenzene | 10.0 | | | 1,500 | | +75 | 555 | 640 | | |
| 13 | Mid-Cont | Propanecresol | 14.4 | | | 1,500 | | +100 | 540 | 605 | | |
| 14 | Mid-Cont | Phenol | 13.6 | | | 41.7 | −82 | +20 | | | | |
| 15 | Mid-Cont | Chlorex | 13.6 | | | 200 | −61 | +75 | | | | |
| 16 | Mid-Cont | Phenol | 8.9 | | | 569 | | +75 | | | | |
| 17 | Mid-Cont | Furfural | 14.9 | | | 50.2 | 25 | +20 | | | | |
| 18 | East Tex | Phenol | 13.5 | 25,000 | | 341 | 17 | +65 | 530 | 610 | 5.76 | 2.36 |
| 19 | do | do | 11.1 | | | 61.5 | −56 | +40 | 435 | 475 | 0.42 | 2.7 |
| 20 | do | do | 13.7 | | | 360 | +25 | +65 | 550 | 630 | 5.5 | 2.3 |
| 21 | do | do | 7.7 | | | 71.1 | −128 | +35 | 420 | 495 | 0.86 | 3.2 |
| 22 | do | do | 7.3 | | | 796 | −76 | +65 | 520 | 610 | 7.7 | 3.0 |
| 41 | do | do | 17.6 | 154 | 80 | 41 | 11 | +30 | 400 | 435 | 0.1 | 2.0 |
| 42 | do | do | 13.7 | 26,000 | 5,615 | 360 | +25 | +65 | 550 | 630 | 5.5 | 2.3 |
| 43 | do | do | 11.1 | 1,054 | 331 | 61.5 | −56 | +40 | 435 | 475 | 0.4 | 2.7 |
| 44 | do | do | 7.7 | 2,007 | 611 | 71.1 | −128 | +35 | 420 | 495 | 0.86 | 3.2 |
| 45 | do | do | 7.3 | 230,000 | 20,800 | 796 | −76 | +65 | 520 | 610 | 7.7 | 3.0 |

Extract No. 41 was obtained in the product of 85 Vis. neutral, had an average molecular weight of 300, and contained 76.8% aromatics (by the silica gel procedure).

Extract No. 42 was obtained in the production of 150 Vis. Bright Stock, had an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 Vis. neutral, had an average molecular weight of 340, contained 84.1% aromatics, 15.9% saturates, 86.4% carbon, 10.7% hydrogen, and averaged 2.7 aromatic rings per aromatic molecule.

Extract No. 44 was obtained in the production of 200 Vis. neutral, had an average molecular weight of 340, contained 87% aromatics and 13% saturates.

Extract No. 45 was obtained in the production of 160 Vis. Bright Stock, and contained 92% aromatics and 8% saturates.

The solvent extracts from lubricating oils used as starting materials for this invention have the following general properties and characteristics:

TABLE II

| Characteristic: | Range of value |
|---|---|
| Gravity, ° API | 7.0–18.3 |
| Specific gravity, 60° F./60° F. | 0.945–1.022 |
| Viscosity SUS @ 210° F. | 40–1500 |
| Viscosity index | −128–+39 |
| Pour point (max.), ° F. | +30–+100 |
| Molecular weight, average | 300–750 |
| Boiling point, ° F. | Above 600 |
| Total sulfur, percent wt. | 0.5–4.5 |
| Sulfur compounds, percent wt. | 5–45 |
| Aromatic hydrocarbons | 25–90 |
| Av. No. of rings/mean arom. mol. | 1.7–3.5 |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of 100±5 VI neutral oils, the viscosities of the extracts increase with increase in stated viscosities of the neutral oils (raffinates). The pour points of extracts are high and are affected by changes in the depth of extraction. The solvent extracts are characterized by containing aromatic and sulfur compounds in the range of 70–90%, the remainder being principally saturates, or material behaving as saturates, together with a minor proportion of from 3.0 to 6.0% of organic acids. The organic acids present are not susceptible to extraction by the use of aqueous strong caustic because of emulsion formation. Very little asphaltic material is present in solvent extracts and they contain no materials volatile at room temperatures.

The materials shown in Tables I and II are merely illustrative and the invention is not to be limited thereby.

The structure normally associated with epichlorohydrin bisphenol-A resins, used in accordance with this invention, is:

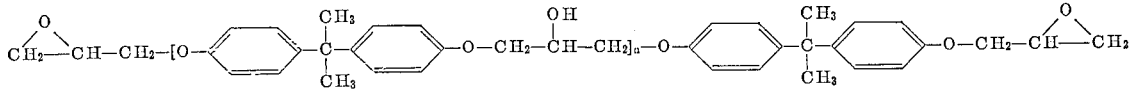

where $n$ has a value of 0 to 10 or more. This invention is directed to the extension or modification of any resin formed by the reaction of an oxirane ring compound and compounds containing hydroxyl groups, the foregoing disclosure and formulae being illustrative. These resins are formed by the reaction of epichlorohydrin (B.P. 116° C.) or glycerol dichlorohydrin and a large variety of di- or polyhydroxyl compounds. Reactions occur through both the oxirane (epoxy) group and the halogen atom. In place of Bisphenol-A such other compounds as glycerol, resorcinol, cresol, various glycols, catechol, hydroquinone, polyhydroxy naphthalenes, novalac-type phenolic resins, and other phenol derivatives may be used, all of which resins come within the scope of this invention.

The uncured epoxy resins are generally liquids and of limited utility. They are accordingly further polymerized or "cured" by appropriate curing agents or catalysts which react with either the terminal epoxide groups or with the secondary hydroxyl groups or both to produce cross-linking or coupling, or esterification and polymerization reaction products of increased utility.

A large number of curing agents are known and used for this purpose, and representative active curing agents are disclosed in Table I of "Modern Plastics," Encyclopedia Issue, September 1957, pp. 108 and 109, any one of which may be used in accordance with this invention. Examples of curing agents that are particularly useful in conjunction with the solvent-extract extenders of this invention are aliphatic amines, N-soya propylene diamine, acid anhydrides, aromatic amines, polyamides, dimethylaminomethyl phenol, diethylaminopropylamine, metaphenylenediamine, diaminodiphenylsulfone, boron trifluoride, boron trifluoride-monoethylamine complex, polysulfide resins, saturated fatty acids, unsaturated fatty acids, and the like.

The various reactions involved in curing the epoxy resins using the foregoing curing agents are explained in the September 1960 issue of "Modern Plastics," Encyclopedia Issue, at pages 220 and 221.

An example of a cross-linked or coupled (cured) epoxy resin is shown by the formula,

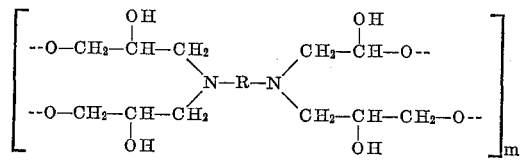

for the repeating unit, where R is an aliphatic radical containing 2 to 20 carbon atoms, or an aromatic radical containing 6 to 14 carbon atoms. An example of a polymerized (cured) epoxy resin prepared from a tertiary amine and a Lewis acid catalyst, such as boron trifluoride, is shown by the formula,

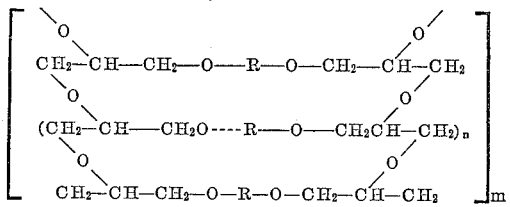

for the repeating unit, where in each of the foregoing formulae the balance of the molecule is as shown previously for epichlorohydrin-Bisphenol-A resins, and in the latter R is an aliphatic radical containing 2 to 20 carbon atoms. The value of $m$ in the foregoing formulae may be 10 to 1000.

Thirteen types of Epon (a registered trademark of Shell Chemical Co.) resins are known and available for formulation into cured coatings, adhesives, castings and laminates in accordance with this invention. All of these resins possess terminal epoxide groups and are known as epoxy-type resins. The primary difference among the various types of Epon resins is molecular weight, which increases as the identifying number increases. The aliphatic epoxy resins useful herein, (e.g., Epon 812) have a chemical structure of a typical molecule as follows:

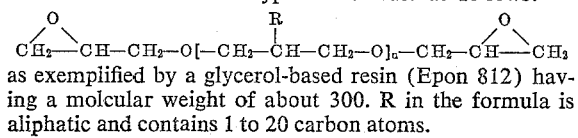

as exemplified by a glycerol-based resin (Epon 812) having a molecular weight of about 300. R in the formula is aliphatic and contains 1 to 20 carbon atoms.

The solvent extracts used herein are further characterized by having as functional nuclei the following aromatic condensed rings as illustrative of the portions thereof which act to extend the finished products:

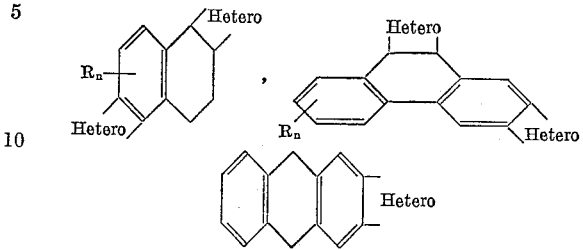

wherein "Hetero" illustrates one or more S-, N-, or O- containing heterocyclic ring substituents, R is an alkyl (or cyclo-paraffinic) radical having a total of 15 to 22 carbon atoms for each nuclei, and $n$ has a value of 3 to 10.

Table III gives the properties of illustrative polyepoxy monomers.

TABLE III.—TYPICAL UNCURED EPOXY RESIN SPECIFICATIONS

| Epon Resin Type | Melting Point,[1] °C. | Color,[2] 25° C. (Gardner), max. | Viscosity,[2] 25° C. | | Epoxide Equivalent[3] |
|---|---|---|---|---|---|
| | | | Gardner-Holdt | Poises | |
| Epon 812 | Liquid | 3 | C-F | 0.9-1.5 | 140-160 |
| Epon 815 | do | 5 | | 5-7 | 175-195 |
| Epon 820 | do | 8 | | 40-100 | 180-195 |
| Epon 826 | do | 5 | | 50-100 | 175-190 |
| Epon 828 | do | 5 | | 100-160 | 180-195 |
| Epon 830 | do | 12 | | 150-225 | 190-210 |
| Epon 834 | do | 5 | O-V | 4.1-9.7 | 230-280 |
| Epon 836 | 40-45 | 5 | $A_1$-B | 0.3-0.7 | 280-350 |
| Epon 1001 | 65-75 | 4 | D-G | 1.0-1.7 | 425-550 |
| Epon 1002 | 75-85 | 4 | G-K | 1.7-3.0 | 550-700 |
| Epon 1004 | 95-105 | 4 | Q-U | 4.6-6.6 | 875-1025 |
| Epon 1007 | 125-135 | 5 | Y-$Z_1$ | 18-28 | 2,000-2,500 |
| Epon 1009 | 145-155 | 5 | $Z_2$-$Z_5$ | 38-100 | 2,500-4,000 |

[1] Durrans' mercury method.
[2] Epon 812, 815, 820, 826, 828 and 830 on resin as supplied, Epon 834 on 70% wt. solution in butyl Carbitol; all other types on 40% wt. solution in butyl Carbitol at 25° C.
[3] Grams of resin containing one gram-equivalent of epoxide.

The extended, epoxy resins formed by the process of this invention, when properly cured by any of the foregoing methods or by using the curing agents disclosed herein, are cheaper to manufacture and have improved properties for the purpose of forming surface coatings when cured with urea, melamine, phenolic resins, fatty acid esters, styrenated esters, or polyamines, and have excellent properties for use as adhesives, laminates, foams, molding compounds, forming tools and fixtures, castings, for potting, encapsulation and embedments following the techniques known in the art. The experiments reported herein have demonstrated that the solvent extract from the manufacture of mineral lubricating oils can be incorporated into epoxy resins without the aid of pyridine and will dissolve in either an aromatic-type or aliphatic-type epoxy resin at temperatures of 240° F. or higher. Also, epichlorohydrin is not essential to the preparation of oil-extended epoxy resins, but is useful where (as a diluent) it aids in the separation of the aromatic fraction (essentially soluble in the epoxy resin) and the non-aromatic fraction (relatively insoluble in the epoxy resin). In the absence of epichlorohydrin, a blend of solvent extract and liquid epoxy resins, having a viscosity at 25° C. of from about 1 to 225 poises (e.g., Epon 812, 820, 828, or 830 or mixtures thereof) when cooled down from 240° F., forms a fine emulsion of the less-soluble fraction of solvent extract in the main body of the blend. This emulsion is very stable, due primarily to its thick, viscous character, unless disturbed by heating or dilution with epichlorohydrin.

Thus this invention contemplates two curing procedures, namely (1) a low-temperature cure at a temperature of about 50° to 90° F. with a polyamine or other curing agent mentioned herein mixed into the cold emulsion and cured at room temperature; this is a departure from the present curing methods and constitutes an improvement over the prior art methods. In a 50/50 blend of solvent extract and epoxy resin, all of the solvent extract dissolves and/or reacts with the cured resin. Then the second curing procedure is (2) a high-temperature cure carried out at a temperature of about 210° to 250° F. with a polyamine or other curing agent wherein about 70–80% or more of the solvent extract goes into the cured resin and a light oil separates and becomes the top layer. This light oil fraction can be separated from the curable heavy fraction, before curing, by warming to about 110° to 130° F., preferably about 120° F., and diluting the mixture with epichlorohydrin and additional liquid epoxy resin.

The first method or cold-cure utilizes the entire solvent extract as the extender and the second method utilizes the soluble portions thereof. The insoluble portion of the solvent extract constitutes a valuable by-product of the second process since the process acts to extract the aromatic, polynuclear, and heterocyclics (containing heterocyclic nuclei of oxygen, nitrogen and sulfur) from the non-aromatic portion of the solvent extract, at a temperature of about 230°–270° F. The epoxy mixture, now rich in the aromatic, polynuclear, and/or heterocyclic residua of the extract, is separated from the light-oil product and cured as in the known curing methods for epoxy resins.

The embodiments of the invention in which an exclusive property or privilege is claimed are defined as follows:

1. A cured extended epoxy resin prepared by mixing
   (1) about 30 parts of phenol extract obtained in the phenol extraction of mineral lubricating oils, said phenol extract being characterized by having a viscosity at 100° F. of about 2000 SUS and a sulfur content of about 3.2 weight percent, with
   (2) about 20 parts of epichlorohydrin, and
   (3) about 10 parts of glycerol-epichlorohydrin epoxy resin having a molecular weight of about 300 and an epoxide equivalent of about 140 to 160, in the presence of
   (4) a catalytic amount of pyridine, heating together for about 1 hour under reflux until excess epichlorohydrin distills off, adding
   (5) about 5 parts additional epichlorohydrin with
   (6) about 20 parts of Bisphenol-A-epichlorohydrin epoxy resin having an epoxide equivalent of about 180 to 195 and curing by reaction with
   (7) about 10 parts of triethylene tetramine.

2. A cured extended epoxy resin prepared by mixing
   (1) about 3 parts of phenol extract obtained in the phenol extraction of mineral lubricating oils, said phenol extract being characterized by having a viscosity at 100° F. of about 2000 SUS and a sulfur content of about 3.2 weight percent, with
   (2) about 3 parts of glycerol-epichlorohydrin epoxy resin having a molecular weight of about 300 and an epoxide equivalent of about 140 to 160, and
   (3) about 2 parts of epichlorohydrin, heating together at a temperature of about 360° to 340° F. for about 5 minutes until excess epichlorohydrin distills off and curing by reaction with
   (4) about 0.9 part of triethylene tetramine at a temperature of about 110° C. for 2 hours.

3. A cured extended epoxy resin prepared by mixing
   (1) about 3 parts of phenol extract obtained in the phenol extraction of mineral lubricating oils, said phenol extract being characterized by having a viscosity at 100° F. of about 2000 SUS and a sulfur content of about 3.2 weight percent, with
   (2) about 3 parts of glycerol-epichlorohydrin epoxy resin, heating together at a temperature of about 390° F. for about 15 minutes until excess epichlorohydrin distills off and curing by reaction with
   (3) about 0.6 part of triethylene tetramine at a temperature of about 110° C. for 2 hours.

4. A cured extended epoxy resin prepared by mixing
   (1) about 3 parts of phenol extract obtained in the phenol extraction of mineral lubricating oils, said phenol extract being characterized by having a viscosity at 100° F. of about 2000 SUS and a sulfur content of about 3.2 weight percent, with
   (2) about 2.3 parts of glycerol epichlorohydrin epoxy resin having a molecular weight of about 300 and an epoxide equivalent of about 140 to 160, and
   (3) about 2 parts of epichlorohydrin, at a temperature of about 390° F. for about 10 minutes until excess epichlorohydrin distills off adding
   (4) about 2 parts of Bisphenol-A-epichlorohydrin epoxy, heating together at a temperature of about 240° F. for about 4 minutes and curing by reacting with
   (5) about 0.8 part of triethylene tetramine at a temperature of about 120° C. for about 2 hours.

5. A cured extended epoxy resin prepared by mixing
   (1) about 3.66 parts of phenol extract obtained in the phenol extraction of mineral lubricating oils, said phenol extract being characterized by having a viscosity at 100° F. of about 2000 SUS and a sulfur content of about 3.2 weight percent, with
   (2) about 3.66 parts of Bisphenol-A-epichlorohydrin epoxy resin having an epoxide equivalent of about 180 to 195 and
   (3) about 2 parts of epichlorohydrin heating together at a temperature of about 390° to 420° F. for about 10 minutes until excess epichlorohydrin distills off and curing by reaction with
   (4) about 0.7 part of triethylene tetramine at room temperature.

6. A cured extended epoxy resin prepared by mixing
   (1) about 3 parts of phenol extract obtained in the phenol extraction of mineral lubricating oils, said phenol extract being characterized by having a viscosity at 100° F. of about 2000 SUS and a sulfur content of about 3.2 weight percent, with
   (2) about 1.5 parts of glycerol-epichlorohydrin epoxy resin having a molecular weight of about 300 and an epoxide equivalent of about 140 to 160, and
   (3) about 1.5 parts of Bisphenol-A-epichlorohydrin epoxy resin and curing by reaction with
   (4) about 0.6 part of triethylene tetramine at room temperature.

7. A cured extended epoxy resin prepared by mixing
   (1) about 3 parts of phenol extract obtained in the phenol extraction of mineral lubricating oils, said phenol extract being characterized by having a viscosity at 100° F. of about 2000 SUS and a sulfur content of about 3.2 weight percent, with
   (2) about 1 part of glycerol-epichlorohydrin epoxy resin having a molecular weight of about 300 and an epoxide equivalent of about 140 to 160, and
   (3) about 2 parts of epichlorohydrin heating together at a temperature of about 390° to 425° F. for about 10 minutes until excess epichlorohydrin distills off, adding
   (4) about 0.4 part of additional epichlorohydrin and
   (5) about 2 parts of Bisphenol-A-epichlorohydrin epoxy resin having an epoxy equivalent of about 180 to 195, heating to a temperature of about 240° to 260° F. for about 3 to 4 minutes, cooling to about 70° F. and curing by reaction with
   (6) about 0.6 part of triethylene tetramine at said temperature.

(References on following page)

References Cited

UNITED STATES PATENTS

| | | | |
|---|---|---|---|
| 2,290,720 | 9/1959 | Simpson | 33—6 |
| 3,006,877 | 10/1961 | Herzberg | 260—28 |
| 3,062,771 | 12/1962 | Boenau et al. | 260—336 |
| 3,105,771 | 10/1963 | Simpson et al. | 260—28 |

OTHER REFERENCES

H. Lee and K. Neville: "Epoxy Resins," McGraw Hill Book Co., New York (1957), pages 141, 142.

MORRIS LIEBMAN, *Primary Examiner.*

NORMAN G. TORCHIN, J. J. KLOCKO, *Examiners.*

J. E. CALLAGHAN, *Assistant Examiner.*